United States Patent [19]
Gerbo

[11] Patent Number: 5,603,286
[45] Date of Patent: Feb. 18, 1997

[54] ANIMAL ALIGNMENT GUIDE FOR A NIPPLE VALVE WATERER

[75] Inventor: Michael R. Gerbo, Conrad, Iowa

[73] Assignee: Ritchie Industries, Inc., Conrad, Iowa

[21] Appl. No.: 444,034

[22] Filed: May 18, 1995

[51] Int. Cl.$^6$ ..................................................... A01K 7/00
[52] U.S. Cl. ............................................. 119/72.5; 119/72
[58] Field of Search ............................... 119/72, 72.5, 71, 119/74, 75

[56] References Cited

U.S. PATENT DOCUMENTS

| | | | |
|---|---|---|---|
| 721,384 | 2/1903 | Phillips | 119/71 |
| 732,630 | 6/1903 | Hall, Jr. | 119/71 |
| 1,460,890 | 8/1921 | Crook, Jr. | 119/71 |
| 3,613,642 | 10/1971 | Restall et al. | 119/55 |
| 3,691,997 | 9/1972 | Hatch | 119/71 |
| 3,777,714 | 12/1973 | Danielsson | 119/75 |
| 4,078,524 | 3/1978 | Peterson et al. | 119/71 |

OTHER PUBLICATIONS

U.S. Des. patent application, Ser. No. 29/038,198; Filed May 1, 1995; entitled Animal Alignment Guide for a Nipple Valve Waterer, from inventor Michael R. Gerbo, Ritchie Industries, Inc.

Primary Examiner—Robert P. Swiatek
Assistant Examiner—Yvonne R. Abbott
Attorney, Agent, or Firm—Henderson & Sturm

[57] ABSTRACT

An animal waterer having an animal alignment guide attached to the water supply line near the juncture of the terminal conduit and the nipple valve. The guide includes an interior portion attached to the water supply line and a pair of guide wings extending out on opposite lateral sides of the nipple valve about the same distance as the trigger of the nipple valve. The vertical position of the nipple valve is adjustable so that the nipple valve can be easily and quickly positioned at the most efficient drinking height for the size of animal being watered. One embodiment of the waterer includes a waterer fed by a flexible feed line, and supported by a chain to freely swing at an elevation of about two inches above the backs of the animals.

24 Claims, 3 Drawing Sheets

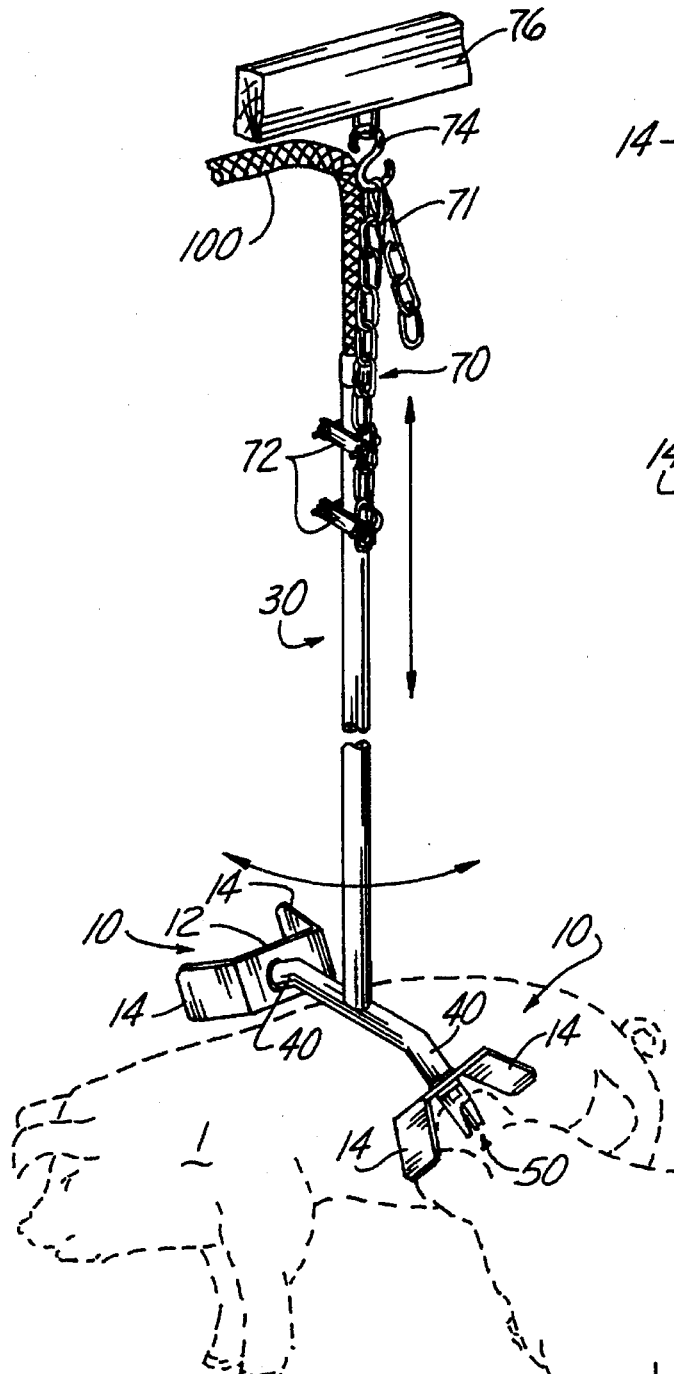
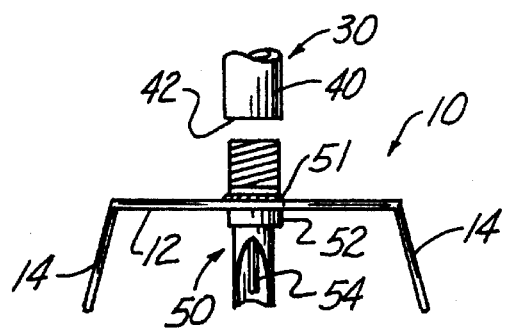
Fig. 2
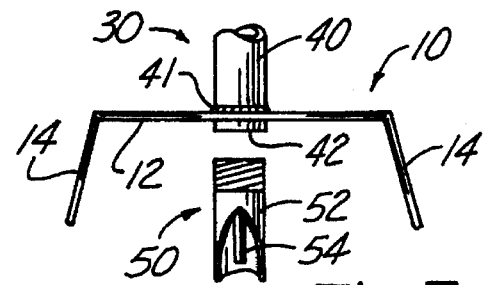
Fig. 3
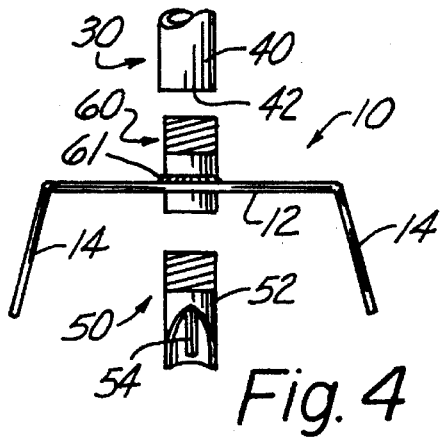
Fig. 4
Fig. 1

5,603,286

ANIMAL ALIGNMENT GUIDE FOR A NIPPLE VALVE WATERER

TECHNICAL FIELD

This invention relates to animal waterers and, more particularly, to waterers utilizing nipple valves with an animal alignment guide.

BACKGROUND ART

The ready availability of clean drinking water is essential to good livestock management. Nipple valves such as the type shown in U.S. Pat. Nos. 3,613,642; 3,691,997; and 3,777,714; are the preferred methods of watering hogs since the nipple valves ensure that all pigs have access to clean water every time they drink.

One problem associated with the use of nipple valves is water waste. When the animal approaches the nipple valve from the side and actuates the trigger, a considerable amount of water is wasted. An alignment guide of the type described in U.S. Pat. No. 4,078,524 directs the animal into the proper straight-on approach to the nipple valve. This eliminates the side mouth drinking and much of the attendant water waste. Also, it enhances good drinking habits in the animals by guarding against them playing with the trigger of the nipple valve, which keeps the valve available for other animals to drink.

Another source of water waste occurs when the animal's head is positioned to be directed down, or level, when drinking. Ideally, the animal's head should be directly up at an angle so that the water will run down its throat. Although the elevation of the nipple valves can be set at a desired height, as the animals grow, the nipple valves must be elevated accordingly. Unless the elevation of the nipple valve can be easily and quickly adjusted, the herdsman will tend to overlook the adjustment until after the water waste becomes a critical problem.

Other problems are encountered when the nipple valves are mounted at a stationary location on the side of a pen. The animals tend to damage the pen in the vicinity of the valves since it is a high traffic area. Also, the animals tend to cause injury to their carcasses and eyes when they come into contact with the valves.

Those concerned with these and other problems recognize the need for an improved animal waterer.

DISCLOSURE OF THE INVENTION

The present invention provides an animal waterer having an animal alignment guide attached to the water supply line near the juncture of the terminal conduit and the nipple valve. The guide includes an interior portion attached to the water supply line and a pair of guide wings extending out on opposite lateral sides of the nipple valve about the same distance as the trigger of the nipple valve. The vertical position of the nipple valve is adjustable so that the nipple valve can be easily and quickly positioned at the most efficient drinking height for the size of animal being watered. One embodiment of the waterer includes a waterer fed by a flexible feed line, and supported by a chain to freely swing at an elevation of about two inches above the backs of the animals.

An object of the present invention is the provision of an improved animal waterer.

Another object is to provide an animal waterer that minimizes water waste.

A further object of the invention is the provision of an animal waterer that fosters good drinking habits in the animals by guarding against play with the trigger of the nipple valve.

Still another object is to provide an animal waterer that is easily and quickly adjustable to an elevation appropriate for the size of the animals being watered.

A still further object of the present invention is the provision of an animal waterer that minimizes injury to the animals and damage to the animal pens.

BRIEF DESCRIPTION OF THE DRAWINGS

These and other attributes of the invention will become more dear upon a thorough study of the following description of the best mode for carrying out the invention, particularly when reviewed in conjunction with the drawings, wherein:

FIG. 1 is a perspective view of the animal alignment guide of the present invention used in conjunction with a swing mounted water supply line having a manifold that supplies a pair of oppositely directed nipple valve waterers;

FIG. 2 is an exploded top plan view illustrating one embodiment where the alignment guide is attached to the body portion of a nipple valve;

FIG. 3 is an exploded top plan view illustrating another embodiment where the alignment guide is attached to the terminal conduit;

FIG. 4 is an exploded top plan view illustrating still another embodiment where the guide is attached to an adapter fitting which is interposed between the terminal conduit and the nipple valve;

BEST MODE FOR CARRYING OUT THE INVENTION

Figure 5:
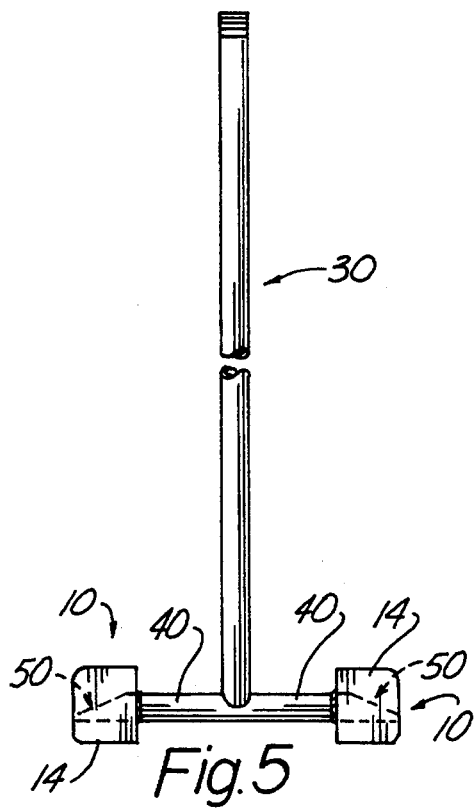
FIG. 5 is a side elevational view showing a two-valve manifold where the nipple valves are horizontally disposed.

Referring now to the drawings, wherein like reference numerals designate identical or corresponding parts throughout the several views, FIG. 1 shows a pair of animal alignment guides (10) of the present invention attached to a swing mounted water supply line (30).

As shown in the drawings, various suspensions and configurations of the water supply line (30) are contemplated as described below. However, as most clearly shown in FIGS. 1–4, each water supply line (30) includes a terminal conduit (40) having a discharge opening (42), and a nipple valve (50) having a body portion (52) and an activation trigger (54). Various nipple valve designs may be used with the guide (10), for example, the valve (50) in FIG. 2 has a configuration designed for piglets whereas the other valves (50) are designed for larger animals.

Figure 8:
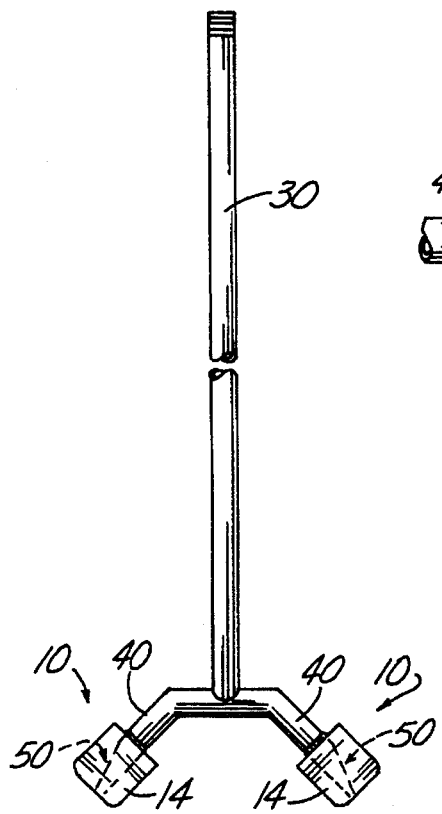
FIG. 8 is a top plan view of the embodiment shown in FIG. 3, where the nipple valve is threadably attached to the terminal conduit and where the wings of the guide extend out about the same distance as the trigger of the nipple valve.

The animal alignment guide (10) shown in FIGS. 1–10, has an interior portion (12) and a pair of outwardly extending wings (14). The wings (14) diverge outwardly from the interior portion (12) at an angle of about 15° from perpendicular. As best shown in FIG. 8, the wings (14) are positioned on opposite lateral sides of the nipple valve (50) and extend outwardly approximately the same distance as the trigger (54) of the valve (50).

Figure 10:
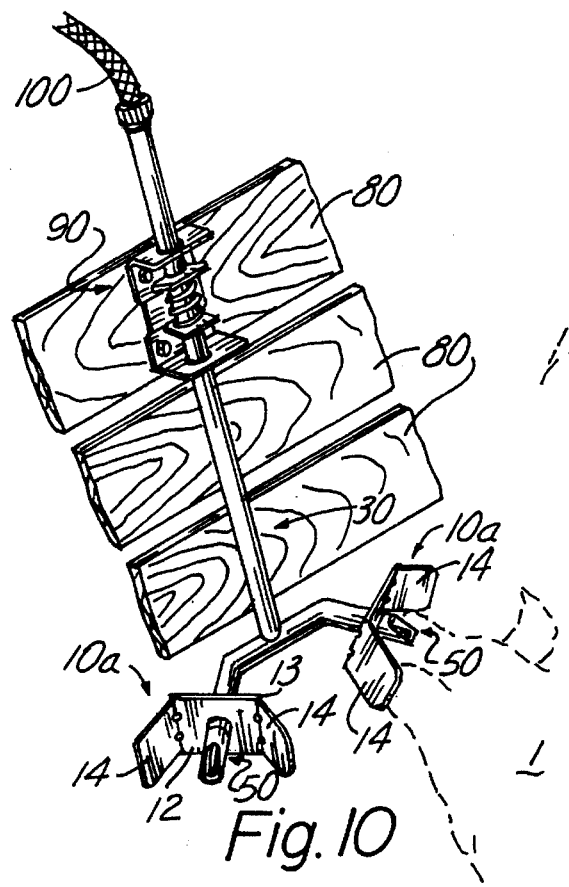
FIG. 10 is a perspective view of the guide used in conjunction with an adjustment bracket attached to an animal pen or other stationary structure.
Figure 12:
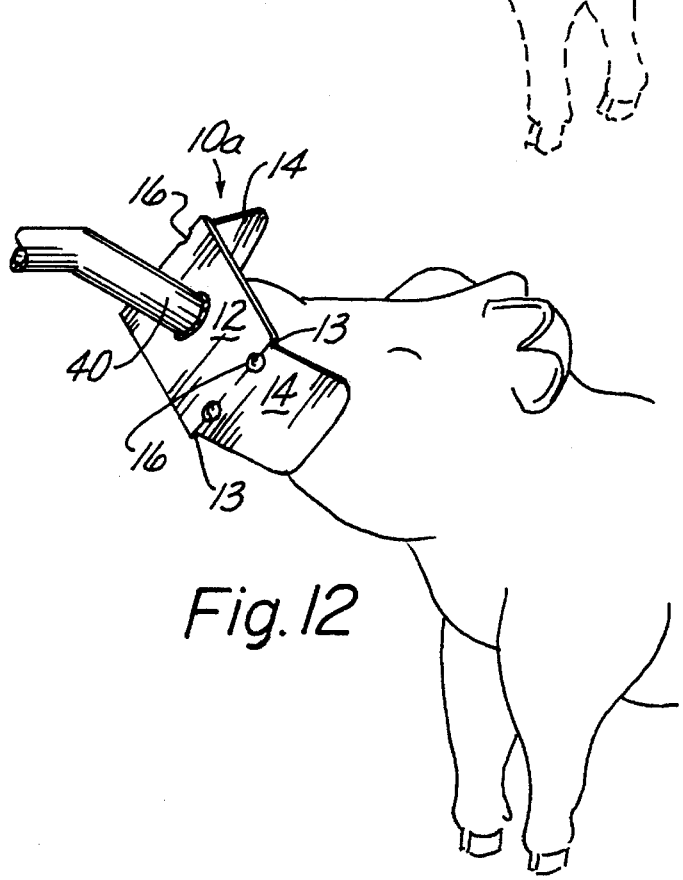
FIG. 12 is an enlarged partial perspective view illustrating an embodiment of the guide having reinforcing dimples formed at the juncture of the interior portion and the extending wings.
Figure 13:
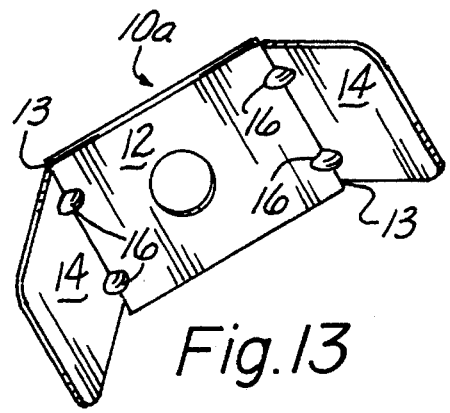
FIG. 13 is a greatly enlarged perspective view showing the front side of the reinforced guide.

FIGS. 10, 12 and 13 show an alternate embodiment animal alignment guide (10a) that differs from the guide (10) in two respects. First, the guide (10a) includes step sections (13) that extend slightly above and below the top and bottom of the adjacent wings (14). These steps (13) are used to separate the parts when the guide (10a) is formed from steel roll stock by a progressive die. Second, the guide (10a) includes reinforcing dimples (16) formed at the juncture of the interior portion (12) and the wings (14).

It is to be understood that other guide configurations could use various wing divergence angles, various interior portion and wing shapes, and various reinforcing structures other than those specifically illustrated.

FIGS. 2–4 show three separate arrangements used to attach the guide (10) to the water supply line (30). FIG. 2 shows the guide (10) attached by a weldment (51) to the body (52) of the valve (50). The threaded section of the valve body (52) is then simply attached to a corresponding threaded section of the terminal conduit (40). FIG. 3 shows a preferred embodiment where the guide (10) is attached by weldment (41) to the terminal conduit (40), and the valve (50) is threadably attached. FIG. 4 shows the guide attached to an street nipple or adapter fitting (60) by weldment (61). The male thread of the adapter (60) engages the corresponding threaded section of the terminal conduit (40), and the valve (50) is threaded into the female threaded portion of the adapter (60). Other methods of attaching the guide (10) to the water supply line (30), such as threading the opening in the interior portion (12) or attachment by set screws, could be used.

Figure 6:
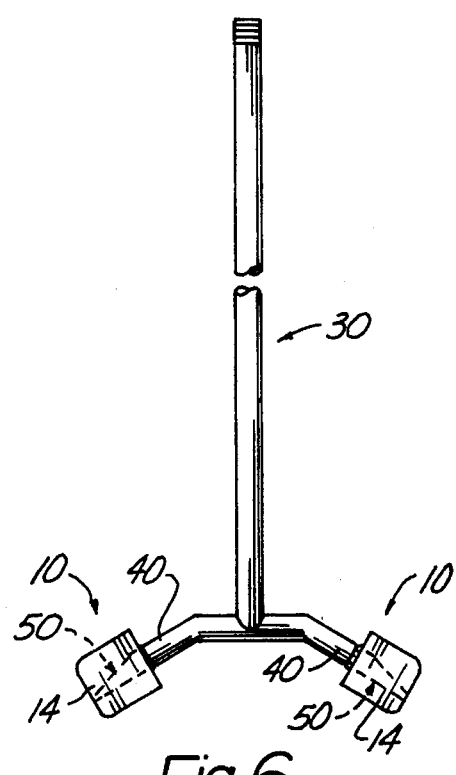
FIG. 6 is a side elevational view showing a two-valve manifold where the nipple valves are directed downwardly at an angle of about 30° from horizontal.
Figure 7:
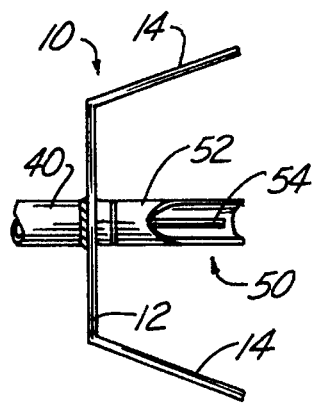
FIG. 7 is a side elevational view showing a two-valve manifold where the nipple valves are directed downwardly at an angle of about 45° from horizontal.
Figure 9:
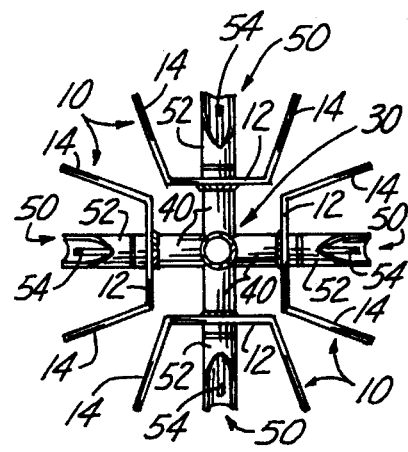
FIG. 9 is a top plan view of the guide used in conjunction with a distribution manifold that supplies four nipple valves.

FIGS. 5–7 illustrate that the nipple valve (50) may be horizontally disposed, directed downwardly from horizontal at about 30°, or directed downwardly at about 45°. FIG. 9 shows a four-valve arrangement as an alternative to the dual valve arrangements shown in the other drawings. Although not shown, the invention may be used with single-valve arrangements or other arrangements having any number of valves.

FIG. 1 illustrates a preferred embodiment where the vertical position of the nipple valve (50) can be adjusted. A chain (70) is connected by clamps (72) to the water supply line (30). A selected link (71) of the chain is engaged by a hook (74) attached to an overhead support such as a ceiling joist (76) in a swine confinement facility. A flexible feed line (100) is provided to allow for the vertical adjustment. To adjust the vertical position of the nipple valves (50), the herdsman simply engages the appropriate link (71) with the hook (74) to position the nipple valves (50) about two inches above the back of the animal (1). This requires the animal to raise its head slightly to drink from the valve (50). The vertical adjustment indicated by the directional arrow can be quickly and easily accomplished to accommodate the animals (1) as they grow from piglets to market size. Also, it can be seen that the waterer is suspended from the chain (70) and will swing in the arc indicated by the arrow when pushed by the animal (1). This swing mounted arrangement provides for minimal resistance to movement which minimizes to potential of injury to the animal (1).

Figure 11:
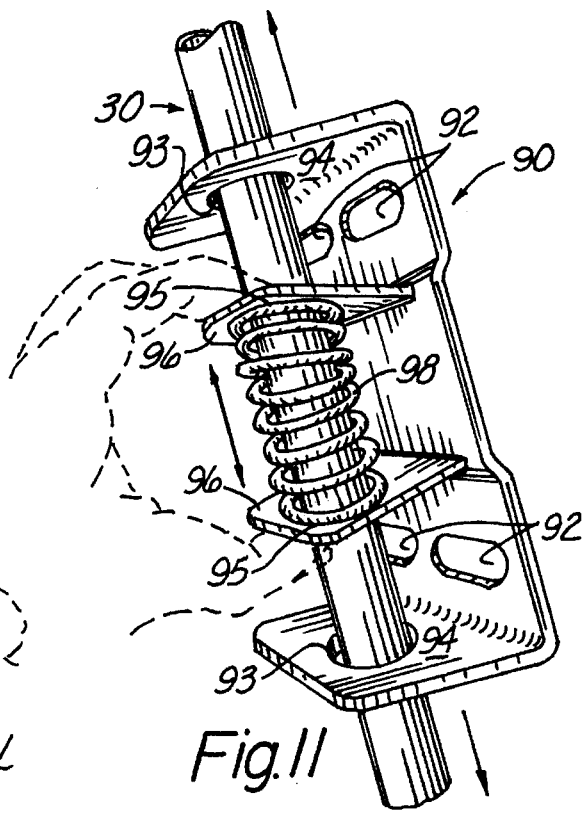
FIG. 11 is an enlarged partial perspective view illustrating the operation of the adjustment bracket.

FIGS. 10 and 11 illustrate an embodiment where the waterer is mounted to a stationary structure such as an animal pen (80) by an adjustment bracket (90). The bracket (90) is mounted to the pen (80) by fasteners received through openings (92). A flattened section of the supply line (30) is received through oblong openings (93) in top and bottom end tabs (94) and openings (95) in a pair of spaced movable tabs (96). A coil spring (98) encircles the water supply line (30) between the movable tabs (96) and biases them apart so that they frictionally engage the line (30). To adjust the elevation of the waterer, the herdsman simply squeezes the tabs (96) together and moves the supply line (30) in the desired direction. When the tabs (96) are released, the spring (98) restores them to biased position. The flexible feed line (100) allows this vertical movement of the line (30). The flattened section of the supply line (30) works in cooperation with the oblong openings (93) in the end tabs (94) to prevent the line (30) from being rotated with respect to the bracket (90). Since the waterer is mounted to a stationary structure (80) the animals (1) can apply significant pressure on the guards (10a). The reinforcing dimples minimize deformation of the guards (10a).

Thus, it can be seen that at least all of the stated objectives have been achieved.

Obviously, many modifications and variations of the present invention are possible in light of the above teachings. It is, therefore, to be understood that, within the scope of the appended claims, the invention may be practiced otherwise than as specifically described.

I claim:

1. In an animal waterer having a water supply line including a vertically suspended swingable and rotatable terminal conduit having a discharge opening and a nipple valve having a body portion and an activation trigger, the body portion being operably attached to the terminal conduit at the discharge opening, the improvement comprising:

an animal alignment guide attached to the water supply line near the juncture of the terminal conduit and the nipple valve, the alignment guide including an interior portion attached to the water supply line and a pair of spaced wings extending out from the interior portion and disposed on opposite lateral sides of the nipple valve; and, quick release means operatively associated with said terminal conduit for changing the elevation of the nipple valve.

2. The waterer of claim 1 wherein the alignment guide is attached to the terminal conduit.

3. The waterer of claim 1 wherein the alignment guide is attached to the body portion of the nipple valve.

4. The waterer of claim 1 further including an adapter fitting interposed between the terminal conduit and the nipple valve, and wherein the alignment guide is attached to the adapter fitting.

5. The waterer of claim 1 wherein the nipple valve is disposed downwardly at an angle of about 30° from horizontal.

6. The waterer of claim 1 wherein the nipple valve is disposed downwardly at an angle of about 45° from horizontal.

7. The waterer of claim 1 wherein the elevation of the nipple valve is positioned about two inches above the back of the animal.

8. The waterer of claim 1 wherein the water supply line is fed by a flexible feeder line.

9. The waterer of claim 1 wherein the wings of the alignment guide extend outwardly about the same distance as the trigger of the nipple valve.

10. The waterer of claim 1 wherein the quick release means allows the terminal conduit to rotate about a vertical axis.

11. The waterer of claim 1 wherein the quick release means includes a hook and chain arrangement.

12. The waterer of claim 1 wherein the quick release means comprises:

an adjustment bracket provided with a pair of spring loaded movable tabs.

13. An animal waterer comprising:

a water supply line including a vertically suspended swingable and rotatable terminal conduit and a nipple valve;

the terminal conduit having a discharge opening;

the nipple valve having a body portion and an activation trigger, the body portion being operably attached to the terminal conduit at the discharge opening;

an animal alignment guide attached to the animal water supply line, the alignment guide including an interior portion attached to the water supply line and a pair of outwardly extending spaced wings extending out from the interior portion and disposed on opposite lateral sides of the nipple valve; and quick release means operatively associated with said terminal conduit for changing the elevation of the nipple valve.

14. The waterer of claim 13 wherein the alignment guide is attached to the terminal conduit.

15. The waterer of claim 13 wherein the alignment guide is attached to the body portion of the nipple valve.

16. The waterer of claim 13 further including an adapter fitting interposed between the terminal conduit and the nipple valve, and wherein the alignment guide is attached to the adapter fitting.

17. The waterer of claim 11 wherein the nipple valve is disposed downwardly at an angle of about 30° from horizontal.

18. The waterer of claim 11 wherein the nipple valve is disposed downwardly at an angle of about 45° from horizontal.

19. The waterer of claim 13 wherein the elevation of the nipple valve is positioned about two inches above the back of the animal.

20. The waterer of claim 13 wherein the water supply line is fed by a flexible supply line.

21. The waterer of claim 13 wherein the wings of the alignment guide extend outwardly about the same distance as the trigger of the nipple valve.

22. The waterer of claim 13 wherein the quick release means allows the terminal conduit to rotate about a vertical axis.

23. The waterer of claim 13 wherein the quick release means includes a hook and chain arrangement.

24. The waterer of claim 13 wherein the quick release means comprises:

an adjustment bracket provided with a pair of spring loaded movable tabs.

* * * * *